(12) United States Patent
Shankar

(10) Patent No.: US 8,751,598 B1
(45) Date of Patent: Jun. 10, 2014

(54) METHOD AND SYSTEM FOR IMPLEMENTING AN UNORDERED DELIVERY OF DATA BETWEEN NODES IN A CLUSTERED STORAGE SYSTEM

(75) Inventor: Hari Shankar, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 110 days.

(21) Appl. No.: 12/938,554

(22) Filed: Nov. 3, 2010

(51) Int. Cl.
*G06F 15/167* (2006.01)

(52) U.S. Cl.
USPC ............ 709/213; 709/219; 707/613; 711/209

(58) Field of Classification Search
USPC .................. 709/213, 219; 707/613; 711/209
See application file for complete search history.

(56) References Cited

U.S. PATENT DOCUMENTS

| | | | | |
|---|---|---|---|---|
| 6,144,999 | A * | 11/2000 | Khalidi et al. | 709/219 |
| 6,842,843 | B1 * | 1/2005 | Vishlitzky et al. | 711/209 |
| 7,143,122 | B2 * | 11/2006 | Burton et al. | 707/613 |
| 7,676,514 | B2 * | 3/2010 | Faibish et al. | 707/646 |
| 8,150,811 | B1 * | 4/2012 | Tarenskeen et al. | 707/659 |
| 2007/0033354 | A1 * | 2/2007 | Burrows et al. | 711/156 |
| 2010/0049930 | A1 * | 2/2010 | Pershin et al. | 711/162 |

* cited by examiner

*Primary Examiner* — Michael C Lai
(74) *Attorney, Agent, or Firm* — Delizio Gilliam PLLC

(57) ABSTRACT

Described herein is a novel technique for implementing an unordered delivery (UOD) of write logs between nodes in a cluster to optimize processing resources during log mirroring operations. A mirroring entry may be generated for each write log in a local log cache constituting the write log and an order indicator for the write log. The order indicator may be, for instance, a storage location of the write log in the local log cache. The mirroring entry may then be forwarded across a network from the local node to the remote node, where the mirroring entry may be stored at a next available location of an interim cache at the remote node independent of the write log storage location in the local log cache.

26 Claims, 8 Drawing Sheets

METHOD AND SYSTEM FOR IMPLEMENTING AN UNORDERED DELIVERY OF DATA BETWEEN NODES IN A CLUSTERED STORAGE SYSTEM

FIELD OF THE INVENTION

The present invention relates to clustered storage systems, and particularly, to a technique for optimizing processing resources during log cache mirroring operations by implementing an unordered delivery of data between nodes in the clustered storage system.

BACKGROUND OF THE INVENTION

A storage system typically comprises one or more storage devices into which information may be entered, and from which information may be obtained. The storage system includes a storage operating system that functionally organizes the system by invoking storage operations in support of a storage service implemented by the system. The storage system may be implemented in accordance with a variety of storage architectures including, but not limited to, a network-attached storage (NAS) environment, a storage area network (SAN) and a storage device assembly directly attached to a client or host computer. The storage devices are typically disk drives organized as a storage array, although other solid state devices including flash memory may also constitute the storage array.

The storage operating system may implement a high-level module or layer of abstraction (e.g., file system), to logically organize the information as a hierarchical structure of data containers, such as volumes, directories, and files. For example, each "on-disk" file may be implemented as set of data structures, e.g., disk blocks, configured to store information, such as the actual data for the file. The disk blocks may be organized within a volume block number (vbn) space that is maintained by the file system, which may also assign each disk block in a file a corresponding "file offset" or file block number (fbn). Sequences of fbns are typically assigned by the file system on a per-file basis, whereas vbns are assigned over a larger volume address space. In addition, the file system may organize the disk blocks within the vbn space as a volume such that each volume may be, although is not necessarily, associated with its own file system.

The storage system may be configured to operate according to a client/server model of information delivery to allow many clients to access data containers stored on the system. In this model, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing access requests (a read or write request) as file-based and block-based protocol messages to the system over the network.

Multiple storage systems may be interconnected to provide a clustered storage system (cluster) configured to service many clients, where each storage system may be a "node" of the cluster. Advantages of a clustered architecture include the nodes being configured to communicate with one another to act collectively to increase performance of or to offset any single node failure within the cluster. For instance, one node of the cluster (local node) may have a predetermined failover "partner" node (remote node) that may take over or resume storage services of the local node upon failure at the local node. When a failure occurs, access requests intended for the local node may be re-directed to the remote node for servicing. For ease of explanation, components residing on the local node may be referred to as a local component, whereas components residing on the remote node may be referred to as a remote component.

Preferably, data access services may be provided by the cluster using shared storage of the cluster, constituting a set of storage devices commonly accessible by the nodes. Clients may then connect to a node of the cluster to submit read or write requests that are received and serviced by the node accessing the shared storage. With write requests, the node may further implement a write log in local non-volatile storage (local log cache) for aggregating write requests and writing data to shared storage at a later point in time. In one instance, deferring write operations may be desirable to optimize system resources during peak access request periods by clients.

When configured to protect against a node failure, the remote node of the cluster may implement a remote log cache which mirrors the local log cache. The remote log cache may then be accessed by the remote node to carry out any remaining write requests on the shared storage. A consistent view between log caches is thus desirable to ensure that write operations not executed by the local node are executed by the remote node in a failover. Similarly, if write logs in the local log cache become corrupt or lost, the remote node may access the remote log cache to carry out any remaining write operations on behalf of the local node.

Known techniques for mirroring log caches between nodes include an "out-of-order delivery" (OOD) of data across multiple connection paths between the nodes to enforce a particular ordering of write logs at the remote node. In contrast with "in-order delivery" (IOD), where data is transmitted to the remote node across a single connection in the same order as it is received at a local node, data may now arrive at the remote node in any order due to the multiple connection paths between nodes. The local node must thus manage the timing of data transmission to enforce the same ordering constraints at the remote node. As an example, data may be transmitted to the remote node in the form of data sets, where multiple data sets (e.g., W, X, and Y) may be grouped together and associated with a metadata set (Z). Metadata set Z may describe each of the related data sets and, for instance, indicate the number of data sets in the group (i.e., 3) and the order of transmission of the data sets (i.e., W, X, Y, and then Z) to enable a consistent view between log caches.

In certain instances, however, corruption and inconsistency may occur if metadata set Z is received by the remote node and written to storage before data sets W, X, and Y. To avoid this problem the local node may implement strict data set ordering constraints by maintaining a request queue for managing the data sets already sent to the remote node. Once confirmation of a successful mirroring operation is returned by the remote node, the local node may remove the completed request from the queue and then transmit the related metadata set. Avoidance of data corruption and inconsistency may thus be achieved since data sets are stored at the remote node prior to transmission of its related metadata set thereby corresponding to the transmission order by the local node.

One known disadvantage with the conventional techniques involves the additional processing required at the local node in enforcing ordering constraints on the data and metadata sets. For OOD as well as IOD, the remote node may further be heavily involved in processing incoming write requests from clients. To avoid remote processing overhead, specialized data placement protocols such as remote direct memory access (RDMA) may be implemented to facilitate a consistent view of log caches between nodes. With RDMA, log writes may be transmitted from the local log cache to the remote log cache and stored directly to a specified location in the remote log cache without consuming processing overhead at the remote node.

An RDMA implementation involves, however, highly specialized interconnects and data placement semantics which may be complex and costly to implement. As storage demands grow, specialized components and semantics are an impractical approach to a flexible and scalable cluster since such configurations are typically vendor-specific and require a tradeoff between high data availability (e.g., protection against node failures) and cost. As such, there is a need for an improved method for mirroring log cache data while optimizing performance and scalability of the cluster.

SUMMARY OF THE INVENTION

Described herein is a novel technique for implementing an unordered delivery (UOD) of write logs between nodes in a cluster to optimize processing resources during log mirroring operations. A mirroring entry may be generated for each write log in a local log cache constituting the write log and an order indicator for the write log. The order indicator may be, for instance, a storage location of the write log in the local log cache. The mirroring entry may then be forwarded across a network from the local node to the remote node, where the mirroring entry may be stored at a next available location of an interim cache at the remote node independent of the write log storage location in the local log cache.

Advantageously, mirroring entries may be stored to a next available location in the remote interim cache to optimize processing overhead of the remote node during log mirroring operations. A network component at the remote node may store incoming mirroring entries to the next available location in the interim cache for promptly storing mirroring entries upon receipt. At a later predetermined time, write logs from entries in the remote interim cache may be organized and stored to the remote log cache at a location indicated by the order indicator to achieve a consistent view between log caches.

Performance of the cluster may in this way be optimized since write logs may be mirrored to the remote node without requiring the local node to maintain a particular transmission order of write logs. Since the local node need not monitor completion of a log mirroring operation prior to sending a next write log, processing and network resources of the cluster may be optimized during such mirroring operations. Deferral of processing by the remote node to organize the write logs from the mirroring entries further allows system resources to be optimized during peak request periods. By mirroring write logs across the network, the need for specialized RDMA components and semantics may be avoided to thereby provide a cluster with increased scalability and flexibility.

DETAILED DESCRIPTION

In the following description, numerous details are set forth for purpose of explanation. However, one of ordinary skill in the art will appreciate that embodiments described herein may be practiced without the use of these specific details. In other instances, well-known structures and devices are shown in block diagram form in order not to obscure the description with unnecessary detail.

I. Cluster Environment

Figure 1:
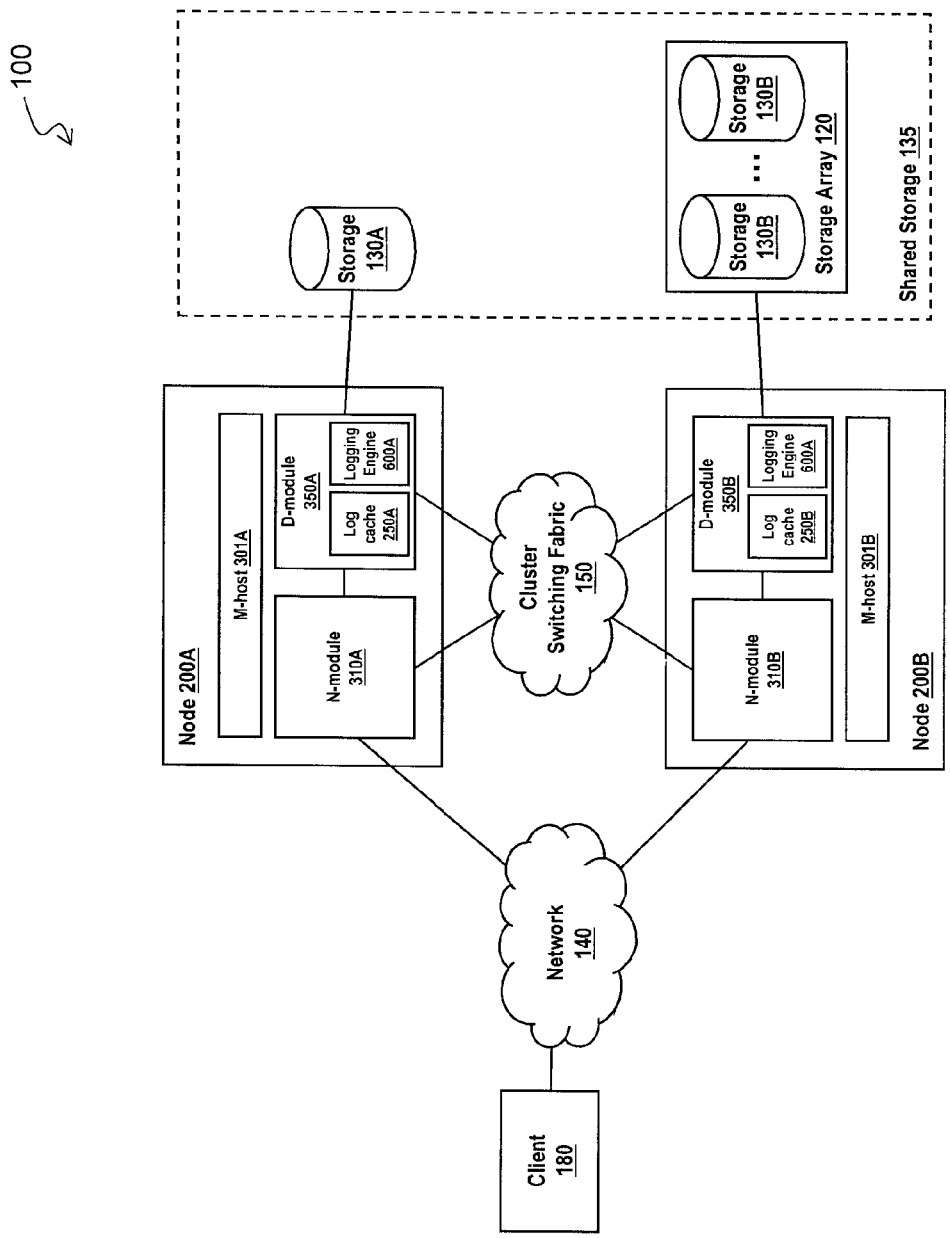
FIG. 1 is a schematic block diagram of an exemplary cluster environment in which some embodiments operate.

FIG. 1 is a schematic block diagram of an exemplary cluster 100 environment in which some embodiments operate. Cluster 100 may comprise multiple interconnected storage systems 200A, 200B (each referred to as a "node") configured to provide storage services for a set of storage devices (e.g., disks) 130. Nodes 200 may be interconnected by a cluster switching fabric 150 (discussed further below) and may comprise various functional components that cooperate to provide a distributed storage system architecture of cluster 100. To that end, each node 200 may be organized as a network element (N-blade 310), a data element (D-blade 350), and a management element (M-host 301). N-blade 310 includes functionality to enable node 200 to connect to clients 180 over a computer network 140, while each D-blade 350 connects to one or more storage devices, such as disks 130, configured as a storage array 120. M-host 301 further provides cluster communication services between nodes 200 for generating information sharing operations to present a distributed file system image for cluster 100.

It should be noted that although disks 130 are used in some embodiments described below, any other type of storage device may be used in accordance with the teachings of the present invention. For example, a solid state storage device may be used instead, including flash memory, non-volatile storage device (NVRAM), Magnetic Random Access Memory (MRAM), Phase Change RAM (PRAM), etc. In other embodiments, storage devices other than those mentioned here may also be used.

It should also be noted that while there is shown an equal number of N- and D-blades in cluster 100, there may be differing numbers of N- and/or D-blades, and/or different types of functional components implementing node 200 in accordance with various embodiments. For example, there may be multiple N-blades and/or D-blades interconnected in cluster 100 that does not reflect a one-to-one correspondence between the N and D-blades of nodes 200. As such, the description of node 200 comprising only one N-blade and one D-blade should be taken as illustrative only. For instance, node 200A may also have one N-blade and a plurality of D-blades, a plurality of N-blades and one D-blade, or a plurality of N-blades and a plurality of D-blades. In addition, the functional components of the N and D-blades may be implemented in other components of node 200 so the novel techniques are not limited to the illustrative embodiment discussed herein.

Clients 180 may be general-purpose computers configured to communicate with nodes 200 in accordance with a client/server model of information delivery. That is, each client 180 may request the services of a node by e.g., submitting a read or write request, and the node may return the results of the services requested by the client 180, by exchanging information packets over network 140. Client 180 may submit access requests by issuing packets using file-based access protocols, such as the Common Internet File System (CIFS) protocol or Network File System (NFS) protocol, over the Transmission Control Protocol/Internet Protocol (TCP/IP) when accessing information in the form of files and directories. Alternatively, client 180 may submit access requests by issuing packets using block-based access protocols, such as the Small Computer Systems Interface (SCSI) protocol encapsulated over TCP (iSCSI) and SCSI encapsulated over Fibre Channel (FCP), when accessing information in the form of blocks.

In some embodiments, the totality of storage space provided by disks 130 constitute shared storage 135 of cluster 100 which may be commonly accessed by nodes 200. Shared storage 135 may be accessible by each D-blade 350 of node 200, for instance, to provide a high availability of service to clients 180 by protecting against a failure of one of nodes 200 or increasing performance of cluster 100. As an example, a write request from the client 180 may be received by any of nodes 200 and carried out on storage array 120 by virtue of each D-blade 350 having access to shared storage 135.

To optimize system resources during periods where a high volume of access requests are serviced by node 200, each node 200 may implement a log cache 250 (250A, 250B), constituting one or more write logs. A write log may, for instance, include information provided by client 180 in a write request, such as a volume identifier and the actual data to be written to disk 130 of shared storage 135. Write logs may then be grouped in log caches for a predetermined period of time and then stored to disk 130. For example, the predetermined time may be during an off-peak request period for cluster 100.

Preferably, one of the nodes, local node 200A, may be configured with one or more predetermined failover "partner" nodes (e.g., node 200B) to provide a high availability of service to clients 180. When node 200A fails, node 200B may automatically resume (e.g., take over) the storage services provided by node 200A. To that end, client requests sent to node 200A may automatically be re-directed to node 200B for servicing to thereby ensure a high availability of service to clients 180 despite a node failure. Note that a node failure may occur unintentionally or intentionally (e.g., where a node is taken offline for servicing) in certain instances.

When configured to protect against a failure, node 200A may further mirror the write logs in local log cache 250A to remote log cache 250B for guaranteeing completion of write requests on disks 130. When node 200A fails, node 200B may then access remote log cache 250B to execute any remaining write operations uncompleted by node 200A. Consistency between log caches 250 is thus desirable to enable completion of write requests on disks 130 despite a node failure.

Illustratively, novel logging engines 600 (600A, 600B) may be operative at nodes 200 to optimize resources of cluster 100 while mirroring log writes across multiple connection paths between the nodes. Advantageously, logging engine 600 may implement an unordered delivery (UOD) technique across cluster switching fabric 150 to produce a consistent view of log caches 250. To that end, a data structure such as a mirroring entry may be implemented by logging engines 600 to transfer write logs from node 200A to node 200B. The mirroring entry may include the write log as well as an order indicator constituting, e.g., a storage address of the write log in local log cache 250A. The order indicator may thus indicate an organization of the write log with respect to other write logs in local log cache 250A. In this way, the write log may be transmitted between nodes using any connection path via cluster switching fabric 150 while avoiding the need for node 200A to enforce a strict arrival and storage order of write logs at node 200B.

Figure 4:
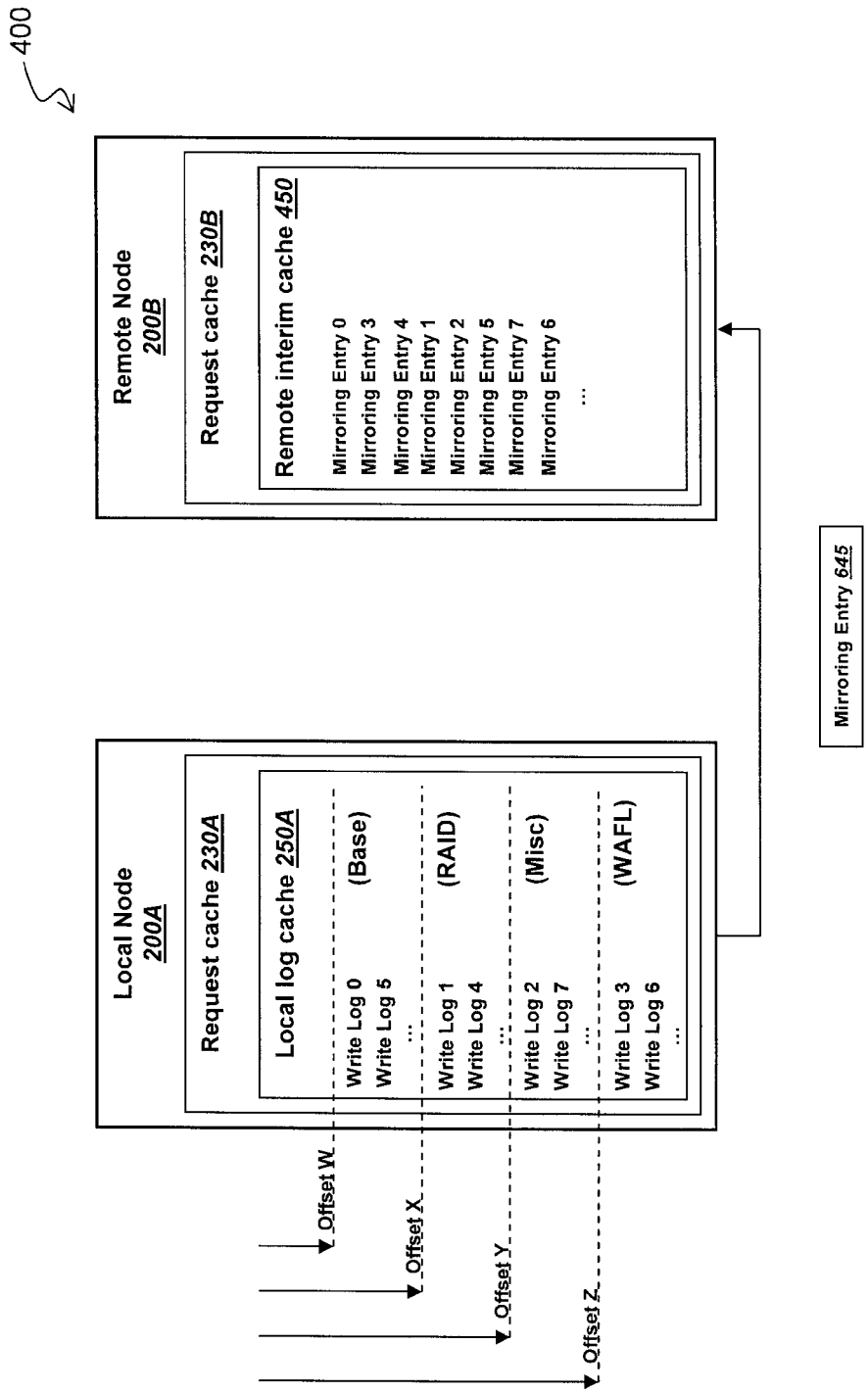
FIG. 4 shows a diagram illustrating an unordered delivery of write logs in a log mirroring operation between a local and remote node in accordance with one embodiment of the present invention.

When received, node 200B may store the mirroring entry to a next available storage location in a remote interim cache (e.g., cache 450 of FIG. 4). Node 200B may further defer processing of the mirroring entries to a later predetermined time, such as during an off-peak request period or upon a failover event. In one embodiment, the processing of mirroring entries may involve extracting the write logs from the mirroring entries and organizing the extracted write logs according to storage locations indicated by the order indicator. The resultant set of ordered write logs may then be stored to log cache 250B to result in a consistent view with log cache 250A.

Figure 2:
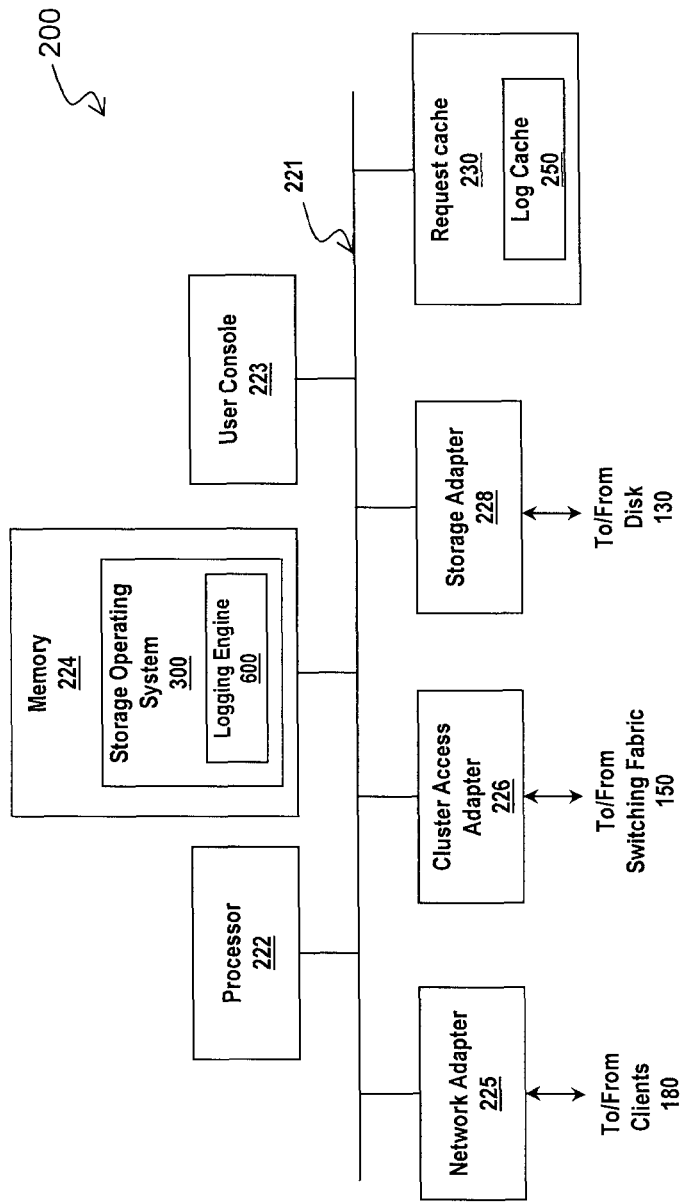
FIG. 2 is a schematic block diagram of an exemplary node that may be implemented in the cluster environment.

FIG. 2 is a schematic block diagram of an exemplary node 200 that may be implemented in cluster 100. Node 200 may illustratively be embodied as a storage system comprising a processor 222, a memory 224, a network adapter 225, a cluster access adapter 226, a storage adapter 228 and non-volatile storage, e.g., request cache 230, interconnected by a system bus 223.

Network adapter 225 comprises a plurality of ports adapted to couple node 200 to one or more clients 180 over point-to-point links, wide area networks, virtual private networks implemented over a public network (Internet) or a shared local area network. Network adapter 225 thus may comprise the mechanical, electrical and signaling circuitry needed to connect the node to the network. Illustratively, computer network 140 may be embodied as an Ethernet network or a Fibre Channel (FC) network. Each client 180 may communicate with node 200 over network 140 by exchanging discrete frames or packets of data according to pre-defined protocols, such as TCP/IP.

Cluster access adapter 226 may comprises a plurality of ports adapted to couple node 200 to other nodes of the cluster through cluster switching fabric 150. In the illustrative embodiment, Ethernet is used as the clustering protocol and interconnect media, although it will be apparent to those skilled in the art that other types of protocols and interconnects may be utilized within the cluster architecture described herein. In alternate embodiments where the N and D-blades are implemented on separate storage systems or computers, cluster access adapter 226 may be utilized by the N/D-blade for communicating with other N/D-blades in the cluster 100. In yet other embodiments, more than one processor 222 may implement node 200, such that one processor executes the functions of N-blade 310, while another processor executes the functions of D-blade 350.

Node 200 is illustratively embodied as a storage system executing a storage operating system 300 that preferably implements a high-level layer of abstraction (e.g., file system)

to logically organize the information as a hierarchical structure of data containers, such as volumes, directories, and files on the disks. Each "on-disk" file, for instance, may be implemented as a set of data structures, e.g., disk blocks, configured to store information such as the actual data for the file. Disk blocks may further be organized as a volume, where each volume may be, although is not necessarily, associated with its own file system.

Storage adapter 228 cooperates with storage operating system 300 executing on node 200 to access information requested by clients 180. The information may be stored on any type of writable storage media such as disk drives, magnetic tape, flash memory, electronic random access memory, or any other media adapted to store information. However, as illustratively described, information is preferably stored on disks 130 configured as storage array 120. Storage adapter 228 comprises a plurality of ports having input/output (I/O) interface circuitry that couples to disks 130 over an I/O interconnect arrangement, such as a conventional high-performance, FC link topology. Storage array 120 may further constitute shared storage 135 of cluster 100 which may be accessed by multiple nodes for increasing cluster performance and protecting against a failure of any single node.

Information on storage array 120 is preferably organized as one or more volumes that comprise a collection of e.g., disks 100 cooperating to define an overall logical arrangement of volume block number (vbn) space on the volume(s). The disks within a volume/file system are typically organized as one or more groups, wherein each group may be operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of parity information with respect to the striped data.

Memory 224 illustratively comprises storage locations that are addressable by the processor 222 and adapters 225, 226, 228 for storing program instructions and data in some embodiments. The processors and adapters may, in turn, comprise processing elements and/or logic circuitry configured to execute the instructions and manipulate the data stored in memory 224. In some embodiments, memory 224 may comprise a form of random access memory (RAM) comprising "volatile" memory that is generally cleared by a power cycle or other reboot operation.

Storage operating system 300, portions of which are typically resident in memory 224 and executed by the processing elements, functionally organizes node 200 by invoking operations in support of the storage services implemented by the node. It will be apparent to those skilled in the art that other processing and memory means, including various computer readable media, may be used for storing and executing program instructions pertaining to the invention described herein. In some embodiments, the storage operating system 300 comprises a plurality of software layers (including logging engine 600) that are executed by processor 222.

A user console 223 may be implemented by node 200 to allow a user (e.g., a storage administrator) to interface with node 200 to supply inputs to or receive outputs from node 200. Preferably, user console 223 may include a keyboard for receiving e.g., command line interface (CLI) inputs from the storage administrator and a monitor for displaying outputs generated by node 200. As an example, the storage administrator may interface with user console 223 when configuring node 200 to communicate with a failover partner for mirroring write logs between the nodes. It will be appreciated that other devices and/or components may implement user console 223, such as a computer remotely located and networked to node 200 (not shown).

One or more non-volatile storage devices may implement a request cache 230 for locally storing information relating to access requests from clients 180. Preferably, request cache 230 may be implemented to store write logs corresponding to write requests from clients 180 in the event of a system shutdown or other unforeseen problem. To that end, write logs may be generated by storage operating system 300 upon receipt of a write request from client 180 for carrying out the requested write operation at a later time. All or a predetermined portion of request cache 230 may thus be implemented as a log cache 250 for storing write logs for deferred write requests. Note that request cache 230 may include disks, flash memory, non-volatile random access memory (NVRAM), Magnetic Random Access Memory (MRAM), Phase Change RAM (PRAM), or any other type of media or device suitable for storing instructions and/or data thereon/in.

Illustratively, novel logging engine 600 may be implemented as program instructions stored in memory 224 and executed by processor 222 for optimizing resources of node 200 during a log cache mirroring operation. To protect against a failure at node 200, log cache 250 may be mirrored by logging engine 600 to a remote node 200' (e.g., node 200B of FIG. 1) via cluster access adapter 226 without node 200 managing the transmission order of the write logs. When implemented at node 200 constituting a local node, logging engine 600 may generate mirroring entries including write logs and order indicators for the write logs. In one embodiment, the order indicators may constitute storage address of the write logs in log cache 250. The mirroring entries may then be supplied by logging engine 600 across cluster access adapter 226 to node 200'.

A remote logging engine 600' may be implemented at node 200' to receive the mirroring entries and store the entries to a next available storage location in a remote interim cache (e.g., cache 450 of FIG. 4). In one example, the interim cache may be accessed by a remote cluster access adapter 225' of node 200' for storing entries received from node 200 based on an arrival order at node 200'. Storage locations in the interim cache may be accessed by adapter 225' sequentially to automatically store mirroring entries to the next available storage location of the interim cache. Illustratively, sequential storage locations addressed by adapter 225' may be updated periodically by the remote storage operating system of node 200' to address new sequential storage locations in the interim cache as currently addressed locations are occupied with mirroring entries.

Advantageously, logging engine 600' may be operative to process the mirroring entries in the interim cache at a later predetermined time to produce a consistent view between log caches at the nodes, while conserving processing resources during peak request periods. For instance, a later predetermined time may involve a predetermined off-peak request period such as during evening or weekend hours. In other instances, the later time may involve a predetermined event such as a failover from node 200 to node 200'. To that end, logging engine 600' may organize the write logs in the mirroring entries of the interim cache based on the order indicators and store the ordered write logs in a remote log cache 250' for access by node 200' during a failover.

II. Storage Operating System Implementing a Logging Engine

To facilitate access to the shared storage 135, storage operating system 300 may implement a file system that cooperates with one or more virtualization modules to "virtualize" the storage space provided by the shared storage. The file system logically organizes the information as a hierarchical structure of named directories and files on the storage devices (e.g., disks) constituting the shared storage. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

In the illustrative embodiment, storage operating system 300 is preferably the Data ONTAP® software operating system available from NetApp, Inc., Sunnyvale, Calif. that implements a Write Anywhere File Layout (WAFL®) file system. However, it is expressly contemplated that any appropriate storage operating system may be implemented for use in accordance with the inventive principles described herein. As such, where the term "WAFL" is employed, it should be taken broadly to refer to any storage operating system that may be otherwise adaptable to the teachings of this invention.

Figure 3:
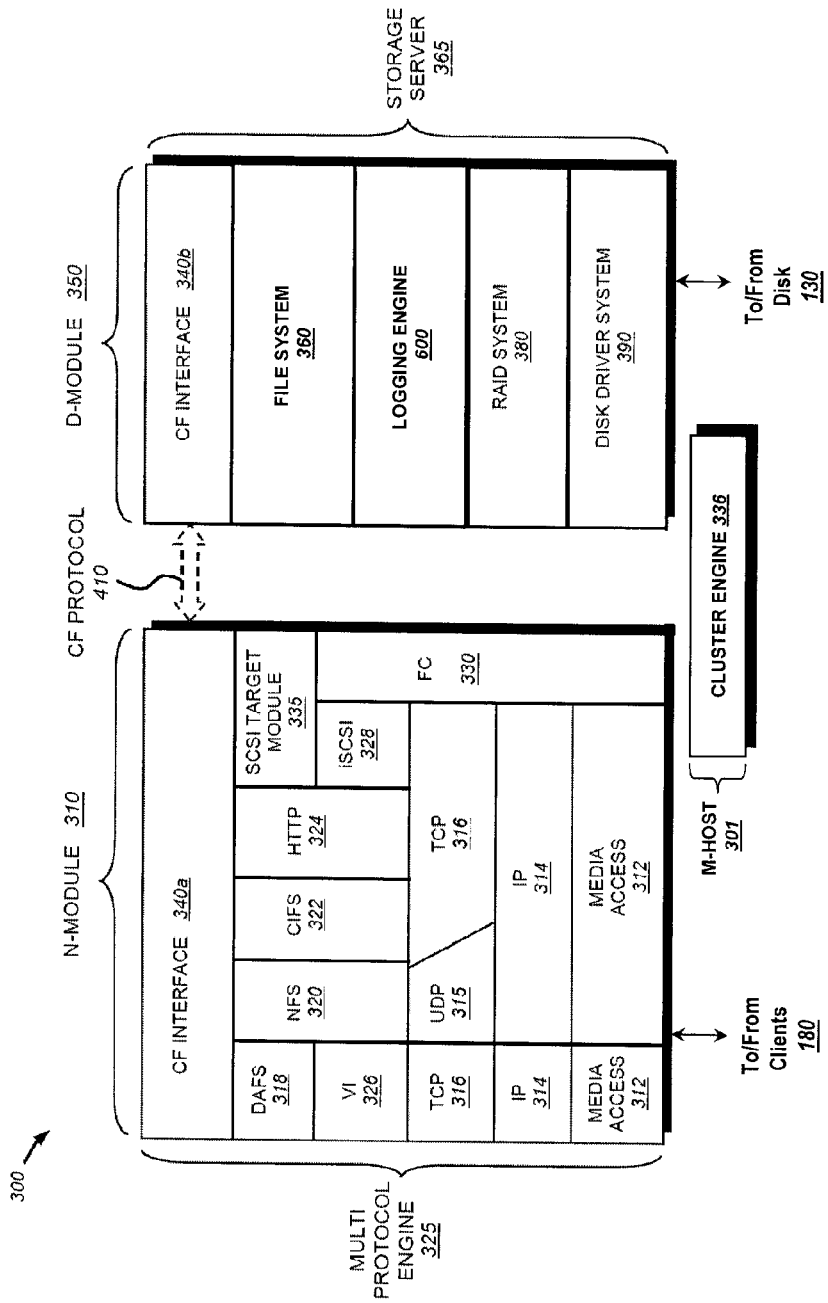
FIG. 3 is a schematic block diagram of an exemplary storage operating system that may be implemented by the node in FIG. 2.

FIG. 3 is a schematic block diagram of an exemplary storage operating system 300 that may be implemented by the node 200. Storage operating system 300 comprises a series of software layers organized to form an integrated network protocol stack or, more generally, a multi-protocol engine 325 (N-blade 310) that provides data paths for clients 180 to access data stored on disk 130 using block and file access protocols. Multi-protocol engine 325 may also facilitate communication across the cluster switching fabric 150 between nodes in cluster 100. Multi-protocol engine 325 includes a media access layer 312 of network drivers (e.g., gigabit Ethernet drivers) that interfaces to network protocol layers, such as an IP layer 314 and its supporting transport mechanisms, a TCP layer 316 and a User Datagram Protocol (UDP) layer 315 (that comprise a transport layer).

A file system protocol layer provides multi-protocol file access and, to that end, may include support for the Direct Access File System (DAFS) protocol 318, the NFS protocol 320, the CIFS protocol 322 and the Hypertext Transfer Protocol (HTTP) protocol 324. A VI layer 326 may implement the VI architecture to provide direct access transport (DAT) capabilities, such as RDMA, as required by DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on node 200.

In addition, storage operating system 300 includes a series of software layers organized to form a storage server 365 (D-blade 350) that provides data paths for accessing information stored on disks 130. To that end, storage server 365 includes a file system module 360, a storage/RAID system layer 380 and a storage device (e.g., disk) driver system module 390. RAID system layer 380 manages the storage and retrieval of information to and from e.g., volumes on disk 130 in accordance with I/O operations, while disk driver system 390 implements a storage device access protocol such as, e.g., the SCSI protocol.

File system 360 implements a virtualization system of storage operating system 300 through the interaction with one or more virtualization modules embodied as, e.g., a virtual disk (vdisk) module (not shown) and a SCSI target module 335. SCSI target module 335 is generally disposed between the FC and iSCSI drivers 328, 330 and file system 360 to provide a translation layer of the virtualization system between the block (lun) space and the file system space, where luns are represented as blocks.

File system 360 is illustratively a message-based system that allocates storage space for itself in a storage device array (e.g., array 120) and controls the layout of information on array 120. File system 360 further provides volume management capabilities for accessing information stored on disk 130. These volume management capabilities may include aggregation of disk space, aggregation of storage bandwidth of the disks, and reliability guarantees, such as mirroring and/or parity (RAID). Preferably, file system 360 implements the WAFL file system having an on-disk format representation that is block-based using, e.g., 4 kilobyte (kB) blocks and using index nodes ("Modes") to identify files and file attributes (such as creation time, access permissions, size and block location). Illustratively, a data container such as an Mode file may be used to describe the layout of file system 360 and may be retrieved from disk 130 using a file handle, i.e., an identifier that includes an Mode number.

All inodes of the write-anywhere file system may be organized into the Mode file. A file system (fs) info block specifies the layout of information in the file system and includes an Mode of a data container, e.g., file, that includes all other Modes of the file system. Each volume has an fsinfo block that may be stored at a fixed or variable location within, e.g., a RAID group. The Mode of the Mode file may directly reference (point to) data blocks of the Mode file or may reference indirect blocks of the Mode file that, in turn, reference data blocks of the Mode file. Within each data block of the mode file are embedded Modes, each of which may reference indirect blocks that, in turn, reference data blocks of a file.

Operationally, an access request (read/write request) from client 180 is forwarded as a packet over network 140 and to node 200 where it is received at network adapter 225. A network driver (of layer 312 or layer 330) processes the packet and, if appropriate, passes it on to a network protocol and file access layer for additional processing prior to forwarding to file system 360. Here, file system 360 produces operations to load (retrieve) the requested data from disk 130 if it is not resident "in core", i.e., in memory 224. If the information is not in memory, file system 360 indexes the requested data into the Mode file using the Mode number to access an appropriate entry and retrieve a logical vbn. File system 360 then passes a message structure including the logical vbn to RAID system 380, whereby the logical vbn is mapped to a disk identifier and disk block number (disk,dbn) and sent to an appropriate driver (e.g., SCSI) of disk driver system 390. Disk driver system 390 then accesses the dbn from the specified disk and loads the requested data block(s) in memory for processing by the node. Upon completion of the access request, node 200 (and storage operating system 300) returns a reply to client 180 over network 140.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment of the invention, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of node 200, implement data access semantics of a general purpose operating system. Storage operating system 300 may also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

In some embodiments, storage server 365 is embodied as D-blade 350 of storage operating system 300 to service one or more volumes of array 120. In addition, multi-protocol engine 325 is embodied as N-blade 310 to perform protocol termination with respect to client 180 issuing incoming data access request packets over network 140, as well as redirect data access requests to another storage server 365 of cluster 100. Moreover, N-blade 310 and D-blade 350 cooperate to provide a highly-scalable, distributed storage system architecture of cluster 100. To that end, each blade includes a cluster fabric (CF) interface module 340a,b adapted to implement intra-cluster communication among the blades (e.g., communication between blades of the same node or communication between blades of different nodes) using CF protocol messages.

For example, the protocol layers (e.g., the NFS/CIFS layers and the iSCSI/FC layers) of N-blade 310 may function as protocol servers that translate file-based and block-based access requests from clients 180 into CF protocol messages used for communication with D-blade 350. In some embodiments, N-blade 310 converts the incoming client access requests into file system primitive operations (commands) that are embedded within CF protocol messages by the CF interface module 340 for transmission to D-blade 350 of cluster 100. Notably, CF interface modules 340 cooperate to provide a single file system image across all D-blades 350 in cluster 100. Thus, any network port of an N-blade that receives a client request can access any data container within the common file system image located on any D-blade 350 of cluster 100.

In some embodiments, N-blade 310 and D-blade 350 are implemented as separately-scheduled processes of storage operating system 300. In other embodiments, N-blade 310 and D-blade 350 may be implemented as separate software components/code within a single operating system process. Communication between N-blade 310 and D-blade 350 in the same node 200 is thus illustratively effected through the use of CF messages passing between the blades. In the case of remote communication between an N-blade and D-blade of different nodes, such CF message passing occurs over cluster switching fabric 150.

A known message-passing mechanism provided by the storage operating system to transfer information between blades (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from NetApp, Inc.

The CF interface module 340 implements the CF protocol for communicating file system commands/messages among the blades of cluster 100. Communication is illustratively effected by the D-blade exposing the CF API to which an N-blade (or another D-blade) issues calls. To that end, the CF interface module 340 is organized as a CF encoder and CF decoder. The CF encoder of, e.g., CF interface 340a on N-blade 310 encapsulates a CF message as a local procedure call (LPC) when communicating a file system command to a D-blade 350 residing on the same node 200, or a remote procedure call (RPC) when communicating the command to a D-blade residing on a remote node 200' (e.g., node 200B) of cluster 100. In either case, the CF decoder of CF interface 340b on D-blade 350 de-encapsulates the CF message and processes the file system command. As used herein, the term "CF message" may be used generally to refer to LPC and RPC communication between blades of the cluster.

Illustratively, novel logging engine 600 may be implemented as layer of storage operating system 300 to implement an unordered delivery of write logs when performing log cache mirroring operations. Logging engine 600 may generate data structures at a local node (e.g., node 200A) such as mirroring entries to store the write logs from a local log cache (e.g., log cache 250A) and order indicators (e.g., storage addresses of the write logs in log cache 250A) which indicate an organization (order) of write logs in log cache 250. In one embodiment, a new mirroring entry may be generated each time storage operation system 300 generates a write log in response to a write request from client 180.

Multi-protocol engine 325 may forward and receive mirroring entries between the nodes (e.g., via cluster switching fabric 150), and further store received mirroring entries to a next available location in an interim cache (e.g., cache 450 of FIG. 4) of a remote node (e.g., node 200B). At a predetermined time or upon a predetermined event (e.g., failover), logging engine 600 may retrieve the mirroring entries from the interim cache and organize the write logs stored therein using the order indicator. The ordered set of write logs may then be stored to a remote log cache (e.g., log cache 250B) thereby producing a consistent view between log caches 250A, 250B.

Upon a failover event in which node 200B may take over the services of node 200A, node 200B may access log cache 250B to determine the remaining write requests to be executed on disk 130. The storage operating system 300 operative a node 200B may thus carry out write operations associated with the write logs in log cache 250B. In particular, layers of storage operating system 300, such as a remote RAID system 350 and remote disk driver system 390, may access log cache 250B to carry out write operations deferred as write logs in log cache 250A.

FIG. 4 shows a conceptual diagram illustrating a view of request caches 230 (230A, 230B), implemented by local and remote nodes 200 (200A, 200B respectively), during log mirroring operations according to one embodiment. Node 200A may generate and store write logs to a log cache 250A of request cache 230A for grouping the write requests received from clients 180. Illustratively, log cache 250A may store write logs generated in response to write requests received by node 200A, although log cache 250A may also store any other types of access request information. In certain embodiments, write logs may be generated in response to operations performed by functional layers of the storage operating system of node 200A. As an example, RAID system 380 and file system 360 may perform data reliability operations and information organization operations requiring the storage of data to disk 130.

Preferably, log cache 250A may be partitioned into portions such that layers of the storage operating system may access dedicated portions of log cache 250A for storage and retrieval of write logs generated by such respective layers. In one embodiment, the partitioning may be implemented by storage operating system 300 during initialization of log cache 250A by configuring each layer to address log cache 250A at an offset value corresponding to a storage location in log cache 250A. In the exemplary embodiment, a base layer may be configured to manage write requests from client 180 and store corresponding write logs at a portion starting at offset W. In contrast, RAID system 380 may access the portion starting at offset X. Other layers of the storage operating system (e.g., Misc, WAFL) may access portions starting at other offset values (e.g., offset Y and Z) for grouping write logs corresponding to write operations requested by such other layers.

As an example, a first write log (write log 0) generated by the base layer may be stored to a first available storage location starting at offset W. A second write log (write log 1) generated by RAID system 380 may be stored to a first available storage location starting at offset X. A third write log (write log 2) generated by yet another layer of the storage operating system may be stored to a first available storage location at offset Y. Additional write logs may similarly be stored to portions of log cache 250A associated with specific layers of the storage operating system. Write operations may then be executed by each layer accessing log cache 250A at the preconfigured offset and requesting write operations for write logs stored therein.

It should be appreciated that log cache 250A may constitute different or additional partitions than those discussed herein. In one embodiment, a portion of log cache 250A may serve as a backup for log cache 250B, such that write logs may be mirrored from log cache 250B to log cache 250A to protect against a failure at node 200B. Accordingly, write operations grouped in log cache 250A may be carried out on disk 130 by one layer of the storage operating system at a point in time independent from write operations executed by another layer by virtue of the partitioning of log cache 250A.

To optimize the mirroring of write logs between log caches 250, write logs stored in log cache 250A may be mirrored to node 200B using an unordered delivery of write logs. Advantageously, an unordered delivery of write logs may involve logging engine 600 sending the write log in a data structure such as a mirroring entry to node 200B as each write log is generated and stored to log cache 250A. The mirroring entry may also include an order indicator (e.g., storage address of the log write in log cache 250A) to enforce an ordering constraint at node 200B while avoiding the need to manage the transmission order of write logs at node 200A.

In the present example, mirroring entries generated at node 200A and forwarded to node 200B may include a first mirroring entry (mirroring entry 0) for write log 0 constituting a <write log, order indicator> tuple such as <write log 0, address W>. Subsequent mirroring entries may similarly constitute tuples including the write log and the order indicator of the write log, such as <write log 1, address X>, <write log 2, address Y>, <write log 3, address Z>, <log data 4, address X+1>, <log data 5, address W+1>, and <log data 6, address Z+1>. Each mirroring entry may then be forwarded by node 200A to node 200B across any of the multiple connection paths between the nodes (e.g., via cluster switching fabric 150).

Notably, a first mirroring entry (mirroring entry 0) sent before a second mirroring entry (mirroring entry 1) may arrive at node 200B after the arrival of mirroring entry 1 as a result of the entries being transmitted across different connection paths. As such, an arrival order of mirroring entries at node 200B may differ from a transmission order of such entries by node 200A. With conventional techniques, node 200A must manage the transmission and arrival order to enforce a consistent view between log caches 250. Using the novel techniques, however, node 200A need not enforce a particular order of arrival at node 200B since an organization of write logs may be generated by node 200B based on the order indicators provided in the mirroring entries.

To optimize storage operations at node 200B, incoming mirroring entries may be stored to a next available storage location in an interim log cache 450 of request cache 230B. In one embodiment, interim cache 450 may be implemented as a logical portion of request cache 230B. In other embodiments, interim cache 450 may be implemented as physically separate memory from request cache 230B and configured by the storage operating system during initialization of request cache 230B.

Illustratively, a mirroring entry received from node 200A may be stored to a next available location in interim cache 450 based on its arrival at remote node 200B. To that end, mirroring entry 2 constituting <write log 2, address Y> may arrive at node 200B after mirroring entry 3 constituting <write log 3, address Z> despite being transmitted at a point in time prior to the transmission of mirroring entry 3. Upon arrival, mirroring entry 3 may be stored to interim cache 450 prior to mirroring entry 2 based on an arrival order at node 200B. As such, write logs in interim cache 450 may be stored in a different order than the order of the mirrored write log in log cache 250A. To achieve a consistent view between log caches, interim cache 450 may be processed by node 200B at a later predetermined time to organize (e.g., sort) the write logs stored therein. The resulting organized set of write logs may then be stored to log cache 250B which constitutes a mirror of log cache 250A.

Figure 5:
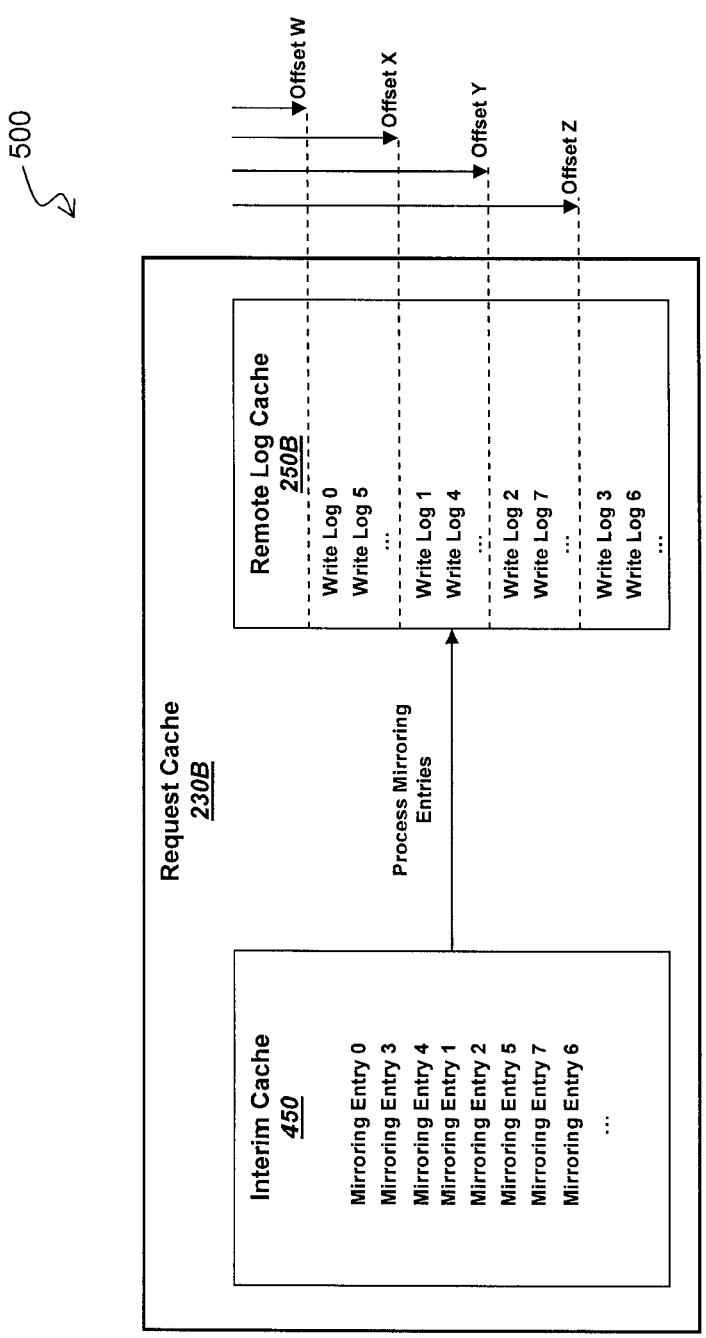
FIG. 5 shows a diagram illustrating the storage of mirroring entries at the remote node and processing write logs from the mirroring entries at a later predetermined time to produce a write log order generated by the local node according to one embodiment.

FIG. 5 shows a conceptual diagram illustrating a view of request cache 230B implementing interim cache 45 and log cache 250B according to one embodiment. Interim cache 450 may embody an unordered set of mirroring entries as a result of such entries being stored to a next available location in interim cache 450 based on their arrival order at node 200B. Advantageously, processing of mirroring entries in interim cache 450 may be deferred and performed at a later predetermined time such as during a off-peak request period or upon the occurrence of a failover to allow node 200B to continue processing storage requests received from client 180.

A resultant set of ordered write logs may then be stored to log cache 250B to mirror the order of write logs at node 200A. As an example, processing of mirroring entry 0 constituting <write log 0, offset W> may result in write log 0 being stored to location offset W in log cache 250B. Since write logs stored in log cache 250B are not accessed by node 200B until a failover, a consistent view of log caches 250 need not exist until an actual failover from node 200A to node 200B. In certain instances, however, earlier processing of mirroring entries in interim cache 450 may be desired to avoid competing resource needs during a failover. To that end, a storage administrator interfacing at node 200B may input a predetermined time for processing interim cache 450 such as during a predefined off-peak request period (e.g., night time, weekends). In other instances, node 200B may organize write logs from the mirroring entries in interim cache 450 upon taking over services of node 200A. Layers of the operating system at node 200B configured to access predefined storage locations in log cache 250B may then retrieve the write logs in log cache 250B at predefined offset values and execute write operations on disks 130.

III. Novel Logging Engine for Mirroring Write Logs

Figure 6:
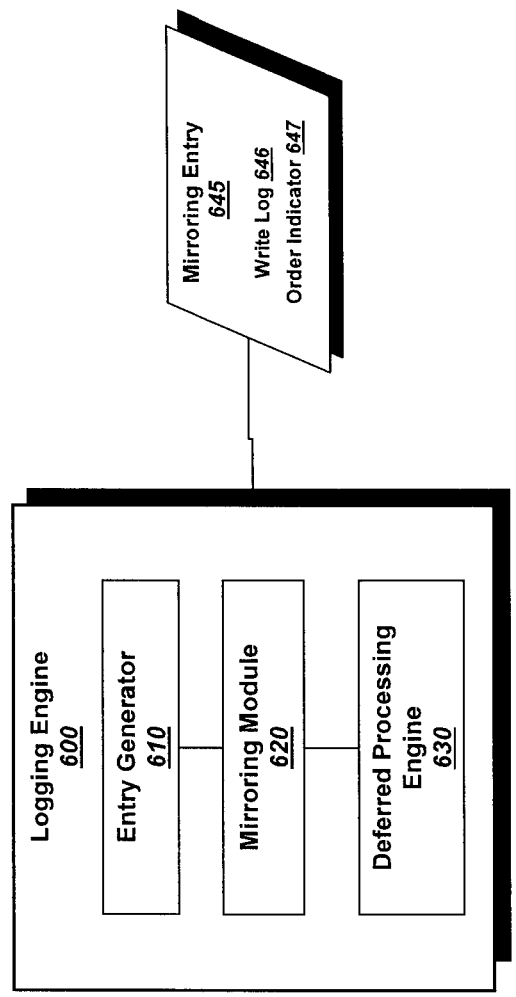
FIG. 6 shows a block diagram of a novel logging engine operative to mirror write logs between nodes in the cluster using an ordered delivery of data.

FIG. 6 is a block diagram of aspects of novel logging engine 600 implemented at nodes (e.g., node 200) in a cluster to optimize processing resources during log mirroring operations. All or a portion of the functional components of logging engine 600 may be implemented by the storage operating system (e.g., storage operating system 300) of a node as a combination of processor-execute software, hardware, or firmware. It will be appreciated that the components constituting logging engine 600 are for illustrative purposes only and, in other embodiments, a different number of components may be implemented to carry out the operations of logging engine 600.

As depicted in FIG. 6, logging engine 600 may include components such as an entry generator 610, a mirroring module 620, and a deferred processing engine 630. Entry generator 610 may be operative at a local node (e.g., node 200A) to generate data structures such as a mirroring entry 645. Mirroring entry 645 may include fields such as a write log 646 and an order indicator 647. Preferably, order indicator 647 may involve a storage address (e.g., offset value) of write log 646 in a local log cache (e.g., log cache 250A). In one example, write log 646 may be generated by the storage operating system when a write request is received by node 200A from a client.

In further detail, when write log 646 is generated and stored to log cache 250A, entry generator 610 may generate mirroring entry 645 to include write log 646. Write log 646 may include data received from the client targeted for a volume on disk (e.g., disk 130) or generated by a layer of the storage operating system intended for disk in certain embodiments. In addition, entry generator 610 may request the address of write log 646 in log cache 250A from, e.g., the storage operating system, and store the address to order indicator 647. Order indicator 647 may thus include an offset value corresponding to a location in log cache 250A, which may be configured into partitions by the storage operating system when initializing functional layers of the storage operating system (e.g., RAID system 380).

Once generated, mirroring entry 645 may be forwarded by mirroring module 620 across a cluster switching fabric (e.g., cluster switching fabric 150) to a remote node (e.g., node 200B) in the cluster. Advantageously, mirroring entry 645 may be forwarded via a cluster access adapter (e.g., adapter 226) across a network connection to avoid the need for specialized RDMA components. In addition, mirroring entry 645 may be transmitted to node 200B via any of the multiple communication paths between the nodes (e.g., cluster switching fabric 150) to increase bandwidth of the cluster during a log mirroring operation.

Mirroring module 620 may be operative at node 200B to receive mirroring entry 645 via a remote cluster access adapter and store mirroring entry 645 to a next available location in an interim cache (e.g., interim cache 450). In one embodiment, the remote cluster access adapter may implement e.g., a circular buffer for addressing sequential locations in interim cache 450. In one embodiment, when initializing the remote cluster access adapter, mirroring module 620 may map locations of the circular buffer (e.g., $X_0$-$X_9$) to a set of sequential locations in the interim cache ($Y_0$-$Y_9$) by requesting such locations from the storage operating system. The buffer mapping may be stored as a data structure in memory (e.g., memory 224) and accessible by mirroring module 620 to address and store mirroring entry 645 to sequential storage locations in interim cache 450.

Mirroring entries received at the remote cluster access adapter may automatically target the circular buffer, which results in storing a mirroring entry to a corresponding location in interim cache 450 based on the buffer mapping. Preferably, the adapter increments through storage addressed of the buffer, which implements a circular scheme. Incrementing from the last storage location in the buffer (e.g., $X_9$) thus causes the adapter to target the initial buffer storage address (e.g., $X_0$). To avoid overwriting mirroring entries stored in interim cache 450 when incrementing through the circular scheme of the buffer, mirroring module 620 may update the buffer mapping by requesting a new set of storage locations of interim cache 450 (e.g., $Y_{10}$-$Y_{19}$) to correspond to locations $X_0$-$X_9$ prior to incrementing to the initial location again, in one embodiment.

To achieve a consistent view between log caches in the nodes, deferred processing engine 630 may be operative at node 200B to write log 646 in mirroring entry 645. In one embodiment, the processing involves a sorting operation on write log 646 using order indicator 647. As an example, deferred processing engine 630 may retrieve write log 646 from mirroring entry 645 and store write log 646 at a location in log cache 250B indicated by order indicator 647. Advantageously, deferred processing engine 630 may organize mirroring entries 645 at a later predetermined time such as during an off-peak request period or following a failover event. In one instance, an administrator of the cluster may input the predetermined time at which deferred processing engine 630 may carry out the processing of mirroring entry 645. In another instance, deferred processing engine 630 may be configured to process entries 645 stored upon receiving a notification, e.g., from the storage operating system of node 200B, that a failover has occurred.

Returning to the example in FIG. 5, processing of mirroring entry 0 may be carried out by extracting write log 0 from mirroring entry 0 and storing write log 0 to the location of offset W in log cache 250B. Write log 3 may be extracted from the next mirroring entry (mirroring entry 3) and stored to the location of offset Z+1. Notably, write log 3 may be sent by node 200A in a particular time order, i.e., after write log 1, but may be received by node 200B in a different time order, i.e., before write log 1. Deferred processing engine 630 may therefore enforce an order on the write logs at node 200B by processing mirroring entry 645 in interim cache 450 to produce an order of write logs in log cache 250B constituting a consistent view with log cache 250A.

When carrying out write operations on disks 130 during a failover, layers of the storage operating system at node 200B may access the preconfigured partitions in log cache 250B to execute remaining write operations. For example, modules of node 200B such as a remote RAID system and a remote WAFL layer may be configured to access predetermined partitions of log cache 250B. Notably, layers of the storage operating system operative at respective nodes 200 may implement the same addressing scheme on respective log caches 250 to ensure the completion of write operations on disk despite a failover.

Preferably, as write logs are carried out by node 200A, mirroring module 620 may also forward such write log updates from log cache 250A to log cache 250B. Updates may be carried out by, for instance, entry generator 610 generating an update constituting mirroring entry 645 having an empty (or null) value as write log 646 and order indicator 647 constituting the storage address of the executed write log. When the update is received by node 200B, mirroring module 620 may store the update to interim cache 450 at a next available storage location. When processed at a later predetermined time, deferred processing engine 630 may delete or overwrite the previously stored write log 646 in the storage location indicated by order indicator 647. It will be appreciated that a value or indicator other than an empty or null value may be implemented as the update so the invention is not so limited to the illustrative embodiment.

Using the novel techniques, performance of the cluster may be optimize since the local node need not manage the time order transmission of write logs to achieve a consistent view with the remote log cache. Instead, write logs may be stored at the remote log cache based on an arrival order without the local node continually querying the remote node for a completed mirroring operation on the remote log cache. Network bandwidth may in this way be optimized for handling client requests rather than carrying out log mirroring operations. Processing resources at the remote node may similarly be optimized for servicing client requests since operations executed to achieve a consistent view of log caches may be deferred until a later time.

Figure 7:
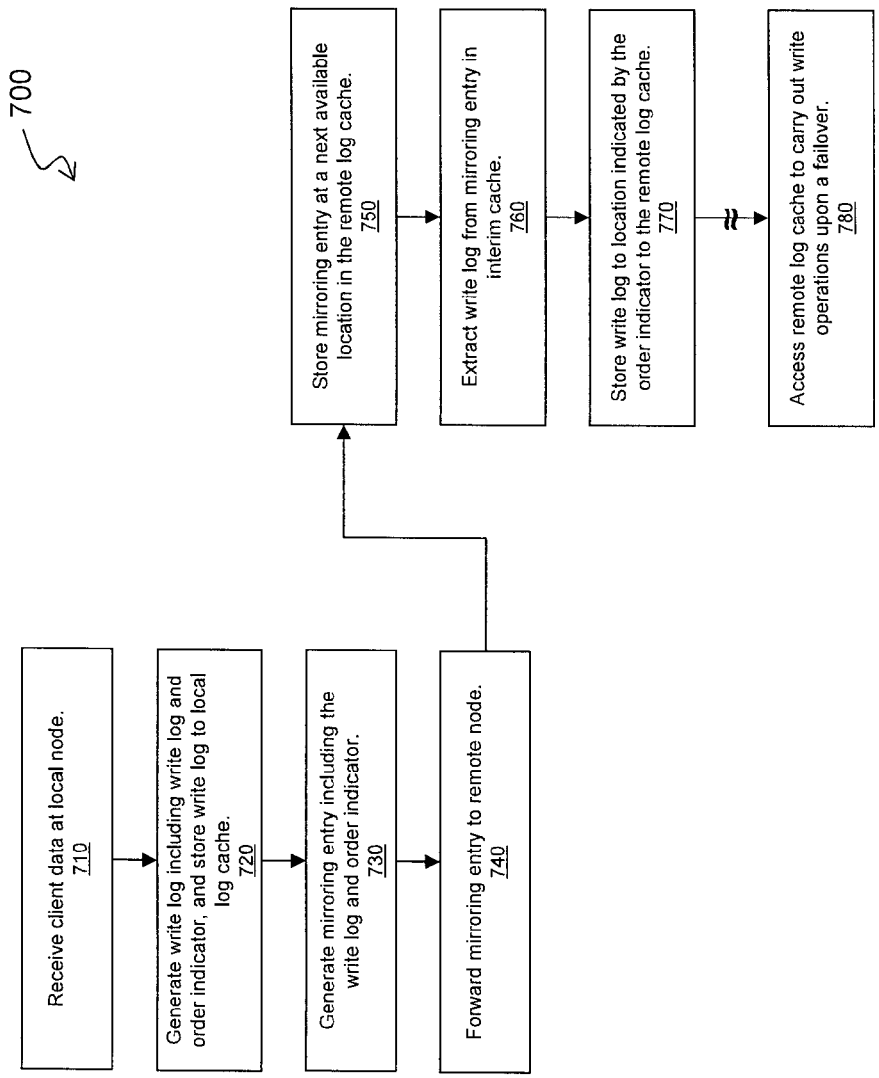
FIG. 7 shows a flow diagram of the novel logging engine implementing an unordered delivery of write logs to produce a consistent view of log caches in the cluster according to an exemplary embodiment of the present invention.

FIG. 7 is a flowchart of a method 700 that may be implemented in partner nodes (e.g., node 200A, 200B) of a cluster (e.g., cluster 100) for optimizing cluster resources during a log mirroring operation. In particular, the novel techniques may be implemented to produce a consistent view between log caches (e.g., log caches 250A, 250B) in nodes while still providing a high availability of service to clients. In some embodiments, the steps of method 700 may be implemented by a combination of processor-executing software, hardware, or firmware. Illustratively, steps of method 700 may be performed by functional components of a logging engine (e.g., logging engine 600) operating at the nodes in accordance with teachings of the present technique. Moreover, the order and number of steps of method 700 are for illustrative purposes only and, in other embodiments, a different order and/or number of steps may be implemented.

At step 710, a local node (e.g., node 200A) may receive a write request from a client which may include data to be stored to a volume on disk (e.g., disk 130) of shared storage (e.g., shared storage 135). Alternatively, the operating system of node 200A (or a layer thereof) may generate a request to write data to shared storage. For example, a RAID system (e.g., RAID system 380) may generate data to be written to disk (e.g., disks 130) when a parity value is calculated on a stripe of data.

Upon receipt or generation of data intended for disk, a write log associated with the requested write operation may be generated by the storage operating system of node 200A and stored to a log cache (e.g., log cache 230A) of node 200A (step 720). Preferably, the storage operating system may store the write log in a partition of log cache 250A based on the source of the request. In the illustrative embodiment of FIG. 4, if the write request is received from a client, a base layer of the storage operating system may store the write log to the portion located at offset W in log cache 250A. If the write request is generated by the RAID system, the write log may be stored to the portion located at offset X in log cache 250A. Other write logs may be stored to other portions of log cache 250A having different preconfigured offset values.

Once generated, the write log may be forwarded by the storage operating system to the logging engine. The order indicator (e.g., offset value) may also be forwarded by the storage operating system to the logging engine. At step 730, an entry generator (e.g., entry generator 610) of the logging engine may generate a mirroring entry (e.g., mirroring entry 645) to include the write log and the order indicator provided by the storage operating system. For instance, the write log may be stored to a write log field (e.g., write log 646) and the order indicator may be stored to an order indicator field (e.g., order indicator 647) of the mirroring entry. The entry generator may then forward the mirroring entry to the remote node (e.g., node 200B) at step 740. Advantageously, the mirroring entry may be forwarded to node 200B across the cluster switching fabric (e.g., cluster switching fabric 150) having multiple network connection paths between the nodes for increasing bandwidth of the cluster and avoiding the need for specialized data placement components.

At step 750, a mirroring module of the logging engine (e.g., mirroring module 620) may be operative at node 200B to receive the mirroring entry and store the mirroring entry based on its arrival order to a next available location of an interim cache of node 200B (e.g., interim cache 450). The mirroring entry may, for instance, be received by a cluster access adapter (e.g., adapter 226) of node 200B and stored to a next available location of interim cache 450. The mirroring entry may be stored to a next available location in interim cache 450 based on a buffer mapping generated by the mirroring module for instance. In the exemplary embodiment, the buffer mapping may be generated by the mirroring module during initialization of the buffer and interim cache 450, or through mapping updates carried out by the mirroring module.

To optimize cluster resources during peak request periods, a deferred processing engine (e.g., deferred processing engine 630) of the logging engine may be operative at node 200B to produce a consistent view between log caches 250. In short, the deferred processing engine may process the mirroring entries in interim cache 250 to produce an ordered set of log writes based on the order indicators at a later predetermined time. Thus, at step 760, the deferred processing engine may extract the write logs from the mirroring entries in interim cache 450. The write logs may then be stored to locations in log cache 250B based on the order indicator associated with the write log in the mirroring entry (step 770).

Advantageously, the deferred processing engine may process the mirroring entries at an off-peak request period to conserve processing resources during peak request periods. To that end, the deferred processing engine may be operative at a predetermined time supplied (input) by the storage administrator in one example. In another example, the deferred processing engine may be operative upon the occurrence of a failover. In each case, the deferred processing engine may process the mirroring entries to result in the storage of an ordered set of write logs to the remote log, which may be accessed when executing uncompleted write operations on disk on behalf of a failed local node. Thus at step 780, log cache 250B may be accessed by node 200B to carry out remaining write operations on disks of the cluster. When a failover from node 200A to node 200B occurs, write logs in log cache 250B may be accessed by node 200B to carry out write operations not completed by node 200A.

Figure 8:
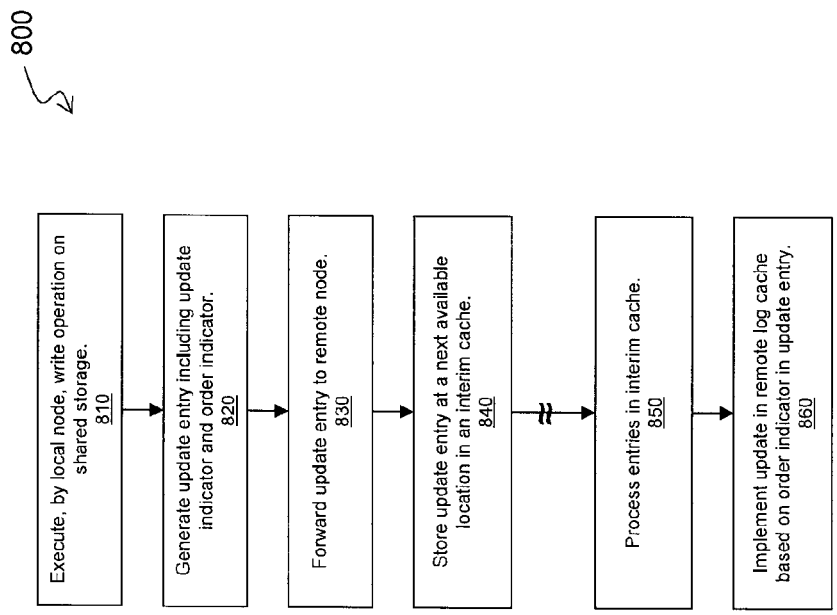
FIG. 8 shows a flow diagram of the novel logging engine updating the remote log cache upon completion of a write operation at the local node according to an exemplary embodiment of the present invention.

FIG. 8 is a flowchart of a method 800 executed by aspects of the novel logging engine (e.g., logging engine 600) to mirror updates of log cache 250A to log cache 250B when write operations associated with logs are executed by the local node (e.g., node 200A). To that end, log cache 250A may be updated by the storage operating system when a write operation associated with a write log is carried out on disk (step 810). To mirror the updated log cache state in log cache 250B, the storage operating system may forward information of the completed write log to the logging engine. For instance, such information may include the storage address of the write log in log cache 250A for generating a mirroring entry constituting an update entry.

When received, the entry generator of the logging engine may generate the update entry using the received address at step 820 of the completed write log. In one embodiment, the storage address may be stored to the order indicator field (e.g., order indicator 647) of the update entry, leaving the write log field (e.g., write log 646) as an empty or null value, or other value constituting an update indicator. At step 830, the entry generator may forward the update entry via the cluster access adapter from node 200A to node 200B across any of the multiple network connection paths between the nodes.

At node 200B, the update entry may be stored by the mirroring module of a remote logging engine to a next available storage location in the interim cache (e.g., interim cache 450) at step 840. In detail, the mirroring entry may be received via the remote cluster access adapter of the remote node and stored to the next available storage location in interim cache 450 based on a buffer mapping accessed by the adapter.

At a predetermined time or event, the deferred processing engine of the logging engine may process the update entry in interim cache 450 (step 850). In one embodiment, processing the update entry may involve the deferred processing engine implementing an order on write logs extracted from updated and/or mirroring stored in interim cache 450 to produce an ordered set of write logs. The ordered write logs may be stored to log cache 250B to thereby produce a consistent view between log cache 250B and log cache 250A. When processing an update entry with an update indicator (e.g., null value) in the write log field, the deferred processing engine may delete, overwrite, or otherwise remove data (e.g., write log) at the address indicated by the order indicator (step 860). In this way, a write log previously stored at the indicated storage location of log cache 250B may be updated to avoid duplicate processing of such write logs by the remote node.

Using the novel techniques, write logs may be mirrored between nodes in a cluster to provide a consistent view of log caches while optimizing network bandwidth and processing resources. Write logs may be sent from a local node to a remote node using an unordered delivery of data to avoid the need for the local node to coordinate the transmission and arrival order of write logs. Complex and costly components such as RDMA may also be avoided since network resources may be implemented to carry out log mirroring operations. Aspects of the novel technique in this way overcome the disadvantages of the prior art.

Some embodiments may be conveniently implemented using a conventional general purpose or a specialized digital computer or microprocessor programmed according to the teachings herein, as will be apparent to those skilled in the computer art. Some embodiments may be implemented by a general purpose computer programmed to perform method or process steps described herein. Such programming may produce a new machine or special purpose computer for performing particular method or process steps and functions (described herein) pursuant to instructions from program software. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information may be represented using any of a variety of different technologies and techniques.

Some embodiments include a computer program product comprising a computer readable non-transitory storage medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a storage medium having instructions stored thereon/in which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those skilled in the art would further appreciate that the various illustrative logical blocks, modules, circuits, techniques, or method steps of embodiments described herein may be implemented as electronic hardware, software-executing computer, firmware or combinations thereof. To illustrate this interchangeability of hardware and software-executing processor, various illustrative components, blocks, modules, circuits, and steps have been described herein generally in terms of their functionality. Whether such functionality is implemented as hardware or software-executing processor depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

What is claimed is:

1. A computer-implemented method comprising:
generating, by a local node in a storage system cluster (cluster), a write log for a plurality of write requests targeted for shared storage of the cluster, each write request of the plurality of write requests having a respective write source;
storing, by the local node, the write log in a local log cache of the local node, the local log cache implementing an ordering constraint on the write log;
generating, by the local node, a mirroring entry comprising the write log and an order indicator of the write log in the local log cache, the order indicator comprising an address corresponding to a storage location in the local log cache and an address offset to partition each of the write requests according to the respective write source;
transmitting the mirroring entry from the local node to a remote node across one of a plurality of network connections between the local node and the remote node;
storing the mirroring entry according to an arrival order at the remote node;
processing, by the remote node, the mirroring entry according to the address and address offset of the order indicator to produce an ordered write log in a remote log cache partitioned according to the respective write source;
executing, by the local node, a write operation for the write log on the shared storage;
transmitting a new mirroring entry comprising an update of the local log cache from the local node to the remote node; and
processing the update on the remote log cache to avoid a duplicate write operation for the write log on the shared storage.

2. The method of claim 1, wherein the ordered write log implements a consistent view between the local log cache and the remote log cache.

3. The method of claim 1, wherein the order indicator comprises a storage address of the write log in the local log cache.

4. The method of claim 1, further comprising transmitting the mirroring entry based on a transmission order, the transmission order comprising a time order of generating the write log.

5. The method of claim 4, wherein the arrival order differs from the transmission order as a result of transmitting the mirroring entry across one of the plurality of network connections.

6. The method of claim 1, wherein the mirroring entry is stored to an interim cache of the remote node based on the arrival order.

7. The method of claim 1, wherein the mirroring entry is processed by the remote node at a later predetermined time.

8. The method of claim 7, wherein the later predetermined time comprises an occurrence of a failover from the local node to the remote node.

9. The method of claim 7, wherein the later predetermined time comprises an off-peak processing time.

10. The method of claim 1, wherein processing the mirroring entry by the remote node comprises:
extracting the write log from the mirroring entry; and
storing the write log to a location in the remote log cache as indicated by the order indicator.

11. The method of claim 1, further comprising:
failing over from the local node to the remote node; and
accessing, by the remote node, the remote log cache to complete a write operation associated with the write log.

12. A computer-implemented method comprising:
sending, by a local node, a mirroring entry to a remote node according to a transmission order, the mirroring entry comprising a write log stored in a local log cache and an order indicator for the write log in the local log cache, the order indicator comprising an address corresponding to a storage location in the local log cache and an address offset to partition write requests according to a respective write source;
receiving, by the remote node, the mirroring entry across one of a plurality of network connections between the local node and the remote node;
storing the mirroring entry at the remote node based on an arrival order, the arrival order different from the transmission order;
storing the write log from the mirroring entry at a location in a remote log cache of the remote node according to the address and address offset of the order indicator to produce a consistent view between the remote log cache and the local log cache partitioned according to the respective write source;
executing, by the local node, a write operation for the write log on a shared storage accessed by the local node and the remote node;
transmitting a new mirroring entry comprising an update of the local log cache from the local node to the remote node; and
processing the update on the remote log cache to avoid a duplicate write operation for the write log on the shared storage.

13. The method of claim 12, wherein the order indicator comprises a storage address of the write log in the local log cache.

14. The method of claim 12, wherein the mirroring entry is stored by the remote node to a next available storage location of an interim cache of the remote node based on the arrival order.

15. The method of claim 12, wherein the write log is stored to the remote log cache at a later predetermined time.

16. The method of claim 12, further comprising extracting, by the remote node, the write log from the mirroring entry prior to storing the write log to the remote log cache.

17. The method of claim 12, further comprising:
failing over from the local node to the remote node; and accessing, by the remote node, the remote log cache to complete a write operation associated with the write log.

18. A computer-implemented method comprising:

generating, by a local node in a storage system cluster (cluster), a write log for a plurality of write requests targeted for shared storage of the cluster and storing the write log in a local log cache of the local node, each of the plurality of write requests having a respective write source;

generating a mirroring entry comprising the write log and an order indicator of the write log in the local log cache, the order indicator comprising an address corresponding to a storage location in the local log cache and an address offset to partition each write request according to the respective write source;

transmitting the mirroring entry from the local node to a remote node across one of a plurality of network connections between the local node and the remote node;

storing the mirroring entry to a next available storage location in an interim cache of the remote node;

processing, at a later predetermined time, the mirroring entry in the interim cache to produce an ordered write log to a storage location in a remote log cache based on the order indicator and partitioned according to the respective write source;

executing, by the local node, a write operation for the write log on the shared storage;

transmitting a new mirroring entry comprising an update of the local log cache from the local node to the remote node; and processing the update on the remote log cache to avoid a duplicate write operation for the write log on the shared storage.

19. A computer-implemented method comprising:

receiving, by a remote node in a storage system cluster (cluster) across a network, a mirroring entry associated with a write log stored at a local node in the cluster, the mirroring entry comprising the write log and an order indicator of the write log, the order indicator comprising an address corresponding to a storage location in the write log and an address offset to partition a plurality of write requests according to respective write sources;

storing the mirroring entry to a next available storage location in an interim cache of the remote node based on an arrival order of the mirroring entry at the remote node;

deferring processing of the mirroring entry in the interim cache until a later predetermined time for producing a consistent view between a remote log cache and a local log cache partitioned according to the respective write sources;

receiving a new mirroring entry comprising an update of the write log from the local node; and processing the update on the remote log cache to avoid a duplicate write operation for the write log on a shared storage accessed by the local node and the remote node.

20. A system comprising:

a processor; and a memory coupled to the processor and configurable for storing instructions, which, when executed by the processor cause the processor to:

generate by an entry generator, at a local node of a cluster, a mirroring entry comprising a write log for a plurality of write requests targeted for shared storage of the cluster, each of the plurality of write requests having a respective write source, the mirroring entry further comprising an order indicator of the write log in a local log cache of the local node, the order indicator comprising an address corresponding to a storage location in the local log cache and an address offset to partition each write request according to the respective write source;

transmit by a mirroring module, based on a transmission order, the mirroring entry from the local node to a remote node across one of a plurality of network connections and store the mirroring entry at the remote node based on an arrival order of the mirroring entry at the remote node;

process by a deferred processing engine the mirroring entry in a remote log cache of the remote node at a later predetermined time to produce a consistent view between the local log cache and the remote log cache partitioned according to the respective write source;

the entry generator configured to complete, at the local node, a write operation associated with the write log on the shared storage and transmit a new mirroring entry to the remote node to indicate a completed write operation; and the mirroring module configured to update the remote log cache with the new mirroring entry to indicate the completed write operation associated with the write log.

21. The system of claim 20, wherein the order indicator comprises a storage address of the write log in the local log cache.

22. The system of claim 20, wherein the transmission order comprises a time order generating of the write log.

23. The system of claim 20, the deferred processing engine further configured to store, at the remote node, the mirroring entry to an interim cache based on an arrival order of the mirroring entry at the remote node.

24. The system of claim 20, the deferred processing engine configured to process the mirroring entry by:

extracting the write log from the mirroring entry; and storing the write log to a storage location in the remote log cache based on the order indicator in the mirroring entry.

25. A system comprising:

a processor; and a memory coupled to the processor and configurable for storing instructions, which, when executed by the processor cause the processor to:

generate, at a local node in a storage system cluster (cluster), a write log for a plurality of write requests targeted for shared storage of the cluster and storing the write log in a local log cache of the local node, the local log cache implementing an ordering constraint on the write log;

generate a mirroring entry comprising the write log and an order indicator of the write log in the local log cache, the order indicator comprising an address corresponding to a storage location in the local log cache and an address offset to partition each of the write requests according to a respective write source;

transmit the mirroring entry from the local node to a remote node across one of a plurality of network connections between the local node and the remote node;

store the mirroring entry according to an arrival order at the remote node;

process, at the remote node the mirroring entry according to the address and address offset of the order indicator to produce an ordered write log in a remote log cache partitioned according to the respective write source;

execute, by the local node, a write operation for the write log on the shared storage;

transmit a new mirroring entry comprising an update of the local log cache from the local node to the remote node; and process the update on the remote log cache to avoid a duplicate write operation for the write log on the shared storage.

26. A system comprising:
a processor; and
a memory coupled to the processor and configurable for storing instructions, which, when executed by the processor cause the processor to:
send, at a local node, a mirroring entry to a remote node according to a transmission order, the mirroring entry comprising a write log stored in a local log cache and an order indicator for the write log in the local log cache, the order indicator comprising an address corresponding to a storage location in the local log cache and an address offset to partition write requests according to each respective write source;
receive, at the remote node, the mirroring entry across one of a plurality of network connections between the local node and the remote node;
store the mirroring entry at the remote node based on an arrival order, the arrival order different from the transmission order;
store the write log from the mirroring entry at a location in a remote log cache of the remote node according to the address and address offset of the order indicator to produce a consistent view between the remote log cache and the local log cache partitioned according to the respective write source;
execute, by the local node, a write operation for the write log on a shared storage accessed by the local node and the remote node;
transmit a new mirroring entry comprising an update of the local log cache from the local node to the remote node; and
process the update on the remote log cache to avoid a duplicate write operation for the write log on the shared storage.

* * * * *